(12) United States Patent
Cress

(10) Patent No.: US 7,766,133 B2
(45) Date of Patent: Aug. 3, 2010

(54) INSERT AND RETAINER FOR SECURING SAME TO AN AIRCRAFT BRAKE DISK

(75) Inventor: James Jay Cress, Mishawaka, IN (US)

(73) Assignee: Honeywell International, Inc., Morristown, NJ (US)

( * ) Notice: Subject to any disclaimer, the term of this patent is extended or adjusted under 35 U.S.C. 154(b) by 447 days.

(21) Appl. No.: 11/806,771

(22) Filed: Jun. 4, 2007

(65) Prior Publication Data

US 2008/0296109 A1    Dec. 4, 2008

(51) Int. Cl.
*F16D 65/12* (2006.01)
(52) U.S. Cl. .................................. 188/218 XL
(58) Field of Classification Search ........... 188/218 XL, 188/251 R, 250 F, 71.5, 218 R; 192/107 R, 192/70.2, 70.19
See application file for complete search history.

(56) References Cited

U.S. PATENT DOCUMENTS

| | | | |
|---|---|---|---|
| 3,550,740 A | 12/1970 | LeBlanc et al. | |
| 3,605,967 A * | 9/1971 | Warren et al. | 192/107 R |
| 3,670,858 A | 6/1972 | Van Horn | |
| 3,907,076 A | 9/1975 | Crossman et al. | |
| 3,972,395 A | 8/1976 | Jannasch et al. | |
| 4,007,814 A | 2/1977 | Berger | |
| 4,155,432 A | 5/1979 | Krause | |
| 4,465,165 A | 8/1984 | Bok | |
| 4,511,021 A * | 4/1985 | Grider | 188/218 XL |
| 4,557,356 A * | 12/1985 | Petersen | 188/218 XL |
| 4,742,948 A | 5/1988 | Fisher et al. | |
| 4,747,473 A | 5/1988 | Bok et al. | |
| 4,784,246 A * | 11/1988 | Edmisten | 188/218 XL |
| 4,863,001 A | 9/1989 | Edmisten | |
| 4,890,700 A | 1/1990 | Guichard | |
| 5,143,184 A | 9/1992 | Snyder et al. | |
| 5,273,140 A | 12/1993 | Berwanger | |
| 5,560,452 A | 10/1996 | Labougle | |

(Continued)

FOREIGN PATENT DOCUMENTS

DE    2 017 787    1/1971

(Continued)

*Primary Examiner*—Robert A Siconolfi
*Assistant Examiner*—Anna Momper
(74) *Attorney, Agent, or Firm*—Birch, Stewart, Kolasch & Birch, LLP

(57) ABSTRACT

An aircraft brake rotor (60) or stator (110) includes a circular disk having first and second walls (62, 112) and a peripheral wall (64, 114) including at least one notch (66, 116) having a bottom (70) and first and second sides (72). The disk further includes first and second peripheral wall portions separated by the notch (66, 116). An insert (10) is mounted in the notch (66, 116) and has first and second legs (14) with inner and outer walls (20, 22) extending along the notch first and second sides (72). The insert (10) has a first portion having a first width. A circumferential distance between the notch first wall (72) and the notch second wall (72) at a position toward the peripheral wall having the notch (66, 116) has a width less than the insert first portion first width. A retainer (30, 118) overlies the disk first and second walls (62, 112) and a portion of the insert (10) to limit axial movement of the insert (10) relative to the rotor (60) or stator (110) disk.

11 Claims, 5 Drawing Sheets

U.S. PATENT DOCUMENTS

| | | |
|---|---|---|
| 6,139,215 A | 10/2000 | Kuhne et al. |
| 6,635,355 B2 | 10/2003 | Bianco et al. |
| 2002/0129998 A1 | 9/2002 | Weber et al. |
| 2007/0193836 A1 | 8/2007 | Walker et al. |

FOREIGN PATENT DOCUMENTS

| | | |
|---|---|---|
| DE | 10 2004 062 795 A1 | 6/2006 |
| EP | 0 161 200 | 11/1985 |
| GB | 2 139 300 | 11/1984 |
| GB | 2 201 475 | 9/1988 |

* cited by examiner

INSERT AND RETAINER FOR SECURING SAME TO AN AIRCRAFT BRAKE DISK

FIELD OF THE INVENTION

The present invention is directed toward an aircraft brake disk having one or more load distributing inserts and retainers for securing the inserts to the brake disk, and, more specifically, toward an aircraft brake disk having one or more load distributing inserts which inserts are radially retained by engagement with the brake disk and axially retained by a retainer which arrangement reduces or eliminates the need to rivet the retainer to the brake disk.

BACKGROUND OF THE INVENTION

A known type of aircraft brake system comprises a plurality of stator disks mounted to a fixed portion of a wheel support and a plurality of rotor disks connected for rotation with an aircraft wheel which rotors extend into spaces between the stators. When braking is required, a piston mounted next to this stack of disks is extended to compress the stack and force the rotors and stators into contact, thus slowing the rotors and the wheel attached thereto.

Rotor drive keys are mounted on the interior of the aircraft wheel to engage the rotors and cause the rotors to rotate with the wheel. These drive keys are essentially metal bars that run parallel to the axis of the wheel and perpendicular to the major faces of the rotor disks. Each rotor disk includes a plurality of notches along its outer periphery through which the drive keys extend, and this notch-and-key arrangement circumferentially couples the rotors to the wheel. Similarly, splines are provided on the torque tube supporting the stators that engage notches on the inner peripheries of the stator disk to help fix the stators circumferentially relative to the torque tube.

Brake rotors and stators are sometimes formed from steel. However, it is becoming common to form the rotor and stator disks from carbon materials. These materials may comprise, for example, carbon embedded in a carbon fiber matrix, which material may be referred to generically as "carbon" or "carbon-carbon." Carbon brake disks may also include notches in their outer peripheral walls for accommodating drive keys and in their inner peripheral walls for accommodating torque tube splines. However, because carbon can be more fragile than steel, these notches also typically include inserts to better distribute the load from the drive keys and/or splines to the rotor or stator and to reduce wear on the carbon brake disks. These inserts are typically formed from steel.

A conventional rotor and rotor insert are illustrated in FIG. 10 which shows a rotor 200 having first and second sides 202, only one of which is visible in FIG. 10, and an outer peripheral wall 204 connecting the sides 202. A notch 206 extends into peripheral wall 204 for receiving a drive key (not shown). The notch has a bottom wall 208 and first and second side walls 210 extending away from bottom wall 208. A rotor insert 212 is mounted in notch 206 and includes a bottom 214 overlying notch bottom wall 208 and first and second legs 216 extending from insert bottom 214 along notch first and second side walls 210. A retainer 218 overlies peripheral wall 204 and projects over the ends and sides of insert legs 216 to secure insert 212 against axial and radial movement with respect to the rotor disk. Rivets 220 pass through openings (not shown) formed in rotor 200 to secure the retainer 218 to both sides 202 of the rotor 200. In use, a drive key (not shown) running through notch 206 will contact insert legs 216 which in turn distribute the load from the drive key over the side walls 210 of the notch 206. Similar inserts may be provided in an inner peripheral wall of a stator disk and secured to the stator disk in a similar manner.

Inserts and retainers such as those described above perform in an acceptable manner. However, a typical rotor disk may have eight to twelve outer peripheral notches, and each retainer often requires about three rivets to secure. It is therefore necessary, in some cases, to drill about 36 openings, align those openings with openings in the retainers, and secure rivets in each of the openings. Similar difficulties are presented when installing inserts in stator inner peripheral walls. Such procedures add to the cost and complexity of rotor and stator assembly. It would therefore be desirable to reduce or eliminate the use of rivets when connecting inserts to rotor or stator disks.

SUMMARY OF THE INVENTION

These problems and others are addressed by embodiments of the present invention, a first aspect of which is an aircraft brake element comprising a circular disk having first and second walls and a peripheral wall connecting the first and second walls, the peripheral wall including at least one notch having a bottom, first and second sides extending away from the bottom, and first and second edges at the peripheral wall. An insert is mounted in the notch and has first and second legs extending along the notch first and second sides, the first and second legs including inner and outer walls. The insert also has a first portion having a first width between the outer walls of the insert first and second legs. A circumferential distance between the notch first wall and the notch second wall at a position between the notch edge and the insert first portion has a width less than the insert first portion first width, and a retainer overlies the disk first and second walls and a portion of the insert to limit axial movement of the insert relative to the disk.

Another aspect of the invention is an aircraft brake element comprising a circular rotor or stator disk having first and second walls and a peripheral wall connecting the first and second walls, the peripheral wall including at least one notch having a bottom and first and second sides extending away from the bottom. An insert is mounted in the notch and has first and second legs extending along the notch first and second sides, and the first and second legs include inner and outer walls. The insert and notch are mutually configured so that the insert is axially but not radially removable from the notch, and a retainer overlies the disk first and second walls to limit axial movement of the insert relative to the rotor disk.

A further aspect of the invention is a method of securing an insert in a peripheral notch of an aircraft brake element that includes steps of providing an aircraft brake disk having first and second sides and a peripheral wall having a notch, the notch having side edges converging in a direction toward the peripheral wall having the notch and providing an insert comprising a central body and first and second legs projecting from the central body, outer portions of the first and second legs converging toward each other. The insert is axially inserted into the peripheral notch, a retainer having a central portion and having first and second parallel walls is provided, the central portion of the retainer is radially inserted into the notch such that the retainer first and second parallel walls overlie the rotor first and second sides, and the retainer is secured to the insert.

BRIEF DESCRIPTION OF THE DRAWINGS

These aspects and features of the invention and others will be better understood after a reading of the following detailed description together with the attached drawings wherein.

DETAILED DESCRIPTION

Figure 1:
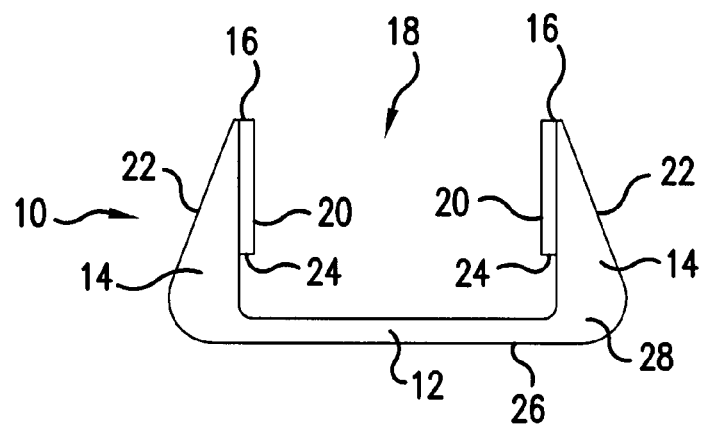
FIG. 1 is a side elevational view of a rotor insert according to an embodiment of the present invention.
Figure 2:
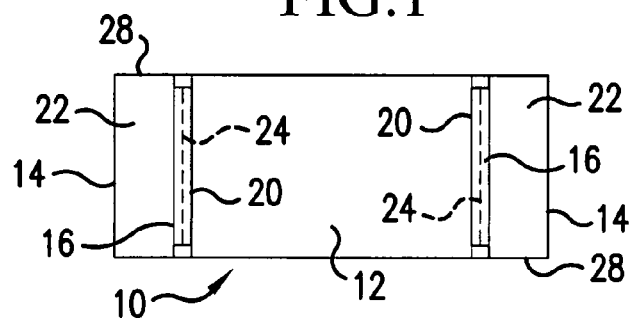
FIG. 2 is a top plan view of the rotor insert of FIG. 1.

Referring now to the drawings, wherein the showings are for purposes of illustrating embodiments of the invention only and not for the purpose of limiting same, FIGS. 1 and 2 illustrate an insert 10 comprising a body 12 and first and second legs 14, each having distal ends 16, extending away from body 12 and defining a gap 18 therebetween. Legs 14 each have an inner wall 20 and an outer wall 22, and each of the inner walls 20 includes an underhang or soffit 24. The distance between inner walls 20 near distal ends 16 of legs 14 is less than the distance between the inner walls 20 near body 12 of the insert 10. Insert 10 further includes a bottom 26 and first and second sides 28. It should be noted that relative terms such as "top" and "bottom" may occasionally be used herein for convenience. These terms refer to the orientation of various elements illustrated in the accompanying drawings. These descriptions are not intended to be limiting, and the positions of the various elements of the present invention will change when the invention is used. Furthermore, terms such as "radial" and "axial" are used with reference to the circular rotor disk 60, part of the periphery of which is illustrated in FIGS. 5-9.

Figure 3:
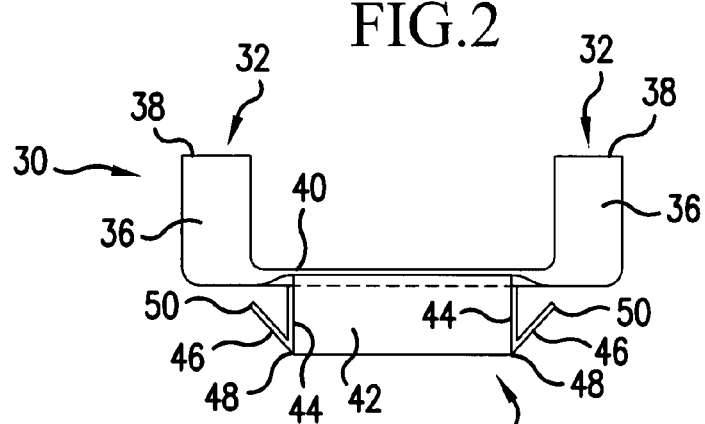
FIG. 3 is a side elevational view of a retainer for holding an insert according to an embodiment of the present invention in a rotor.
Figure 4:
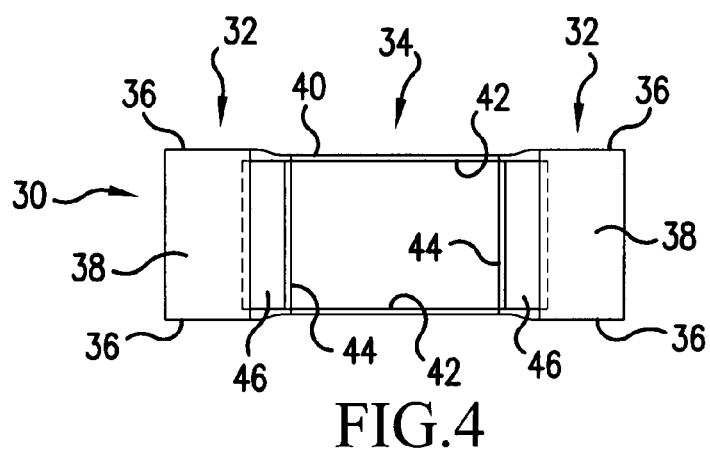
FIG. 4 is a top plan view of the retainer of FIG. 3.
Figure 7:
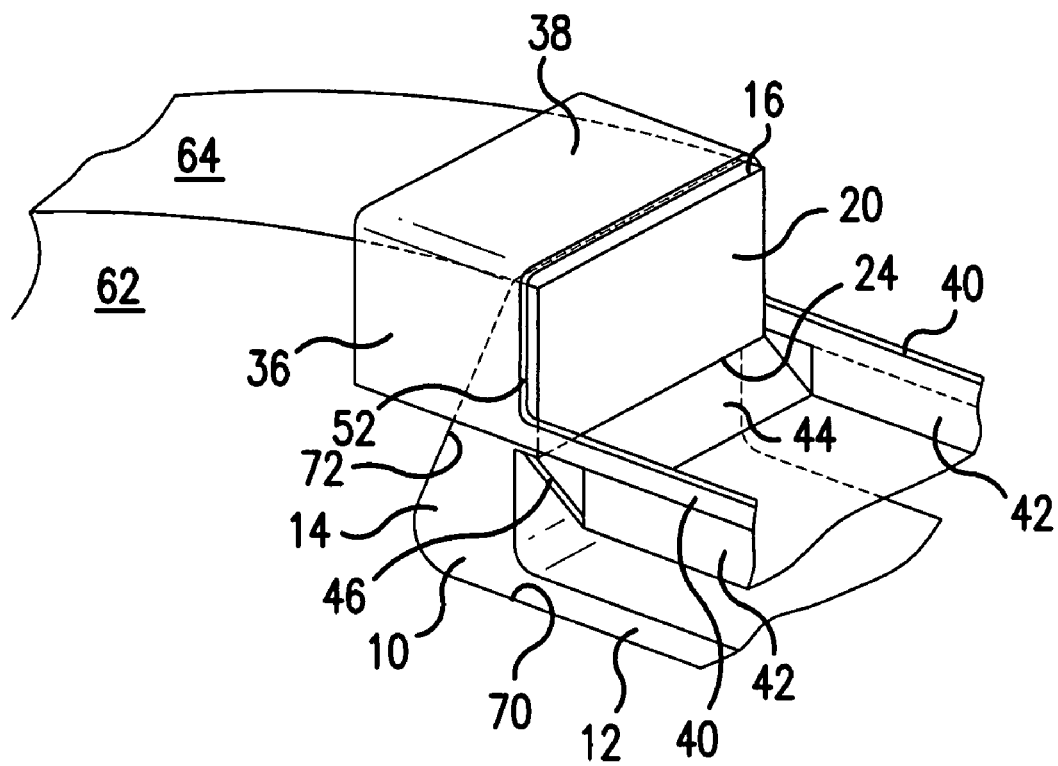
FIG. 7 is a perspective view of a portion of the rotor disk of FIG. 5 taken in the direction of line VI-VI.

FIGS. 3 and 4 illustrate a retainer 30 comprising first and second end portions 32 connected by a central portion 34. End portions 32 each include first and second parallel side walls 36 and a top wall 38 connecting the first and second side walls 36. Central portion 34 is defined, in part, by flanges 40 comprises extensions of first and second side walls 36 twisted 90 degrees so that they are perpendicular to the first and second side walls 36. From flanges 40 depend a first pair of central body walls 42 which walls 42 are connected by a second pair of central body walls 44, forming a somewhat box-like structure between the first and second end portions 30. Each wall of the second pair of central body walls 44 includes a flexible flap 46 connected to the second pair of walls 44 at a hinge portion 48 and having a terminal edge 50. Openings 52, best illustrated in FIG. 7, are defined by the central body second pair of walls 44 and the edges of parallel side walls 36 and top walls 38.

Figure 5:
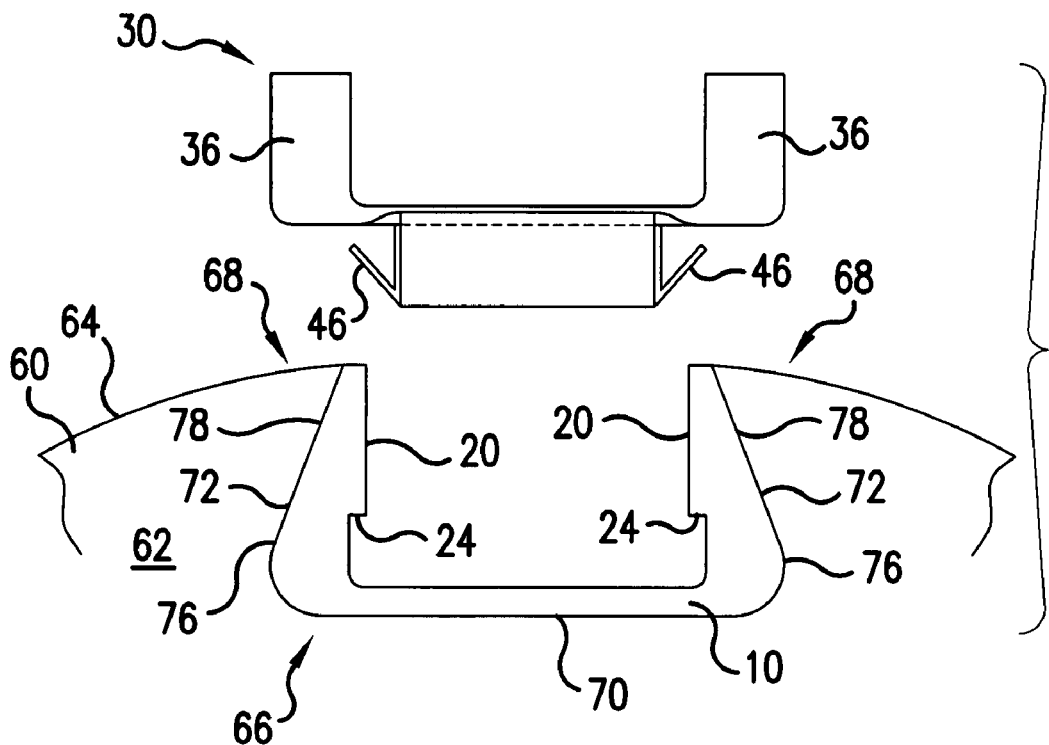
FIG. 5 illustrates the retainer of FIG. 3 being connected to the insert of FIG. 1 after the insert of FIG. 1 has been inserted into a notch in a rotor disk.
Figure 6:
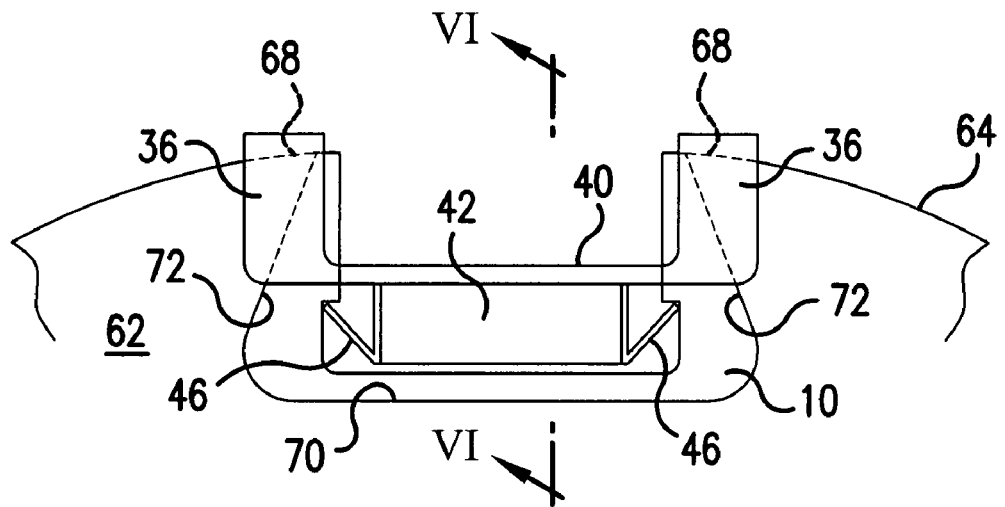
FIG. 6 is a side elevational view of the insert of FIG. 1 mounted in a peripheral notch in a rotor disk and secured to the disk with the retainer of FIG. 3.

A rotor disk 60 is illustrated in FIG. 5 and includes first and second side walls 62 connected by an outer peripheral wall 64 having a notch 66 and first and second wall portions 68 on the peripheral wall 64 on either side of notch 66. Notch 66 has a bottom 70 and first and second sides 72 extending away from bottom 70 toward outer peripheral wall 64. According to an aspect of the present invention, first and second sides 72 of notch 66 can be linear or curved or have a shape formed of various lines and curves. In addition, a spacing between notch first and second sides 72 at a first point, such as point 76 in FIG. 5, is greater than a spacing between notch first and second sides 72 at a point radially outward of point 76 such as point 78. This shape helps retain an insert, such as insert 10, radially in notch 66 as described hereafter. It will be appreciated from FIG. 2, for example, that the distal portions of insert 10 are narrower in the rotor thickness direction than body 12 of insert 10 to accommodate flanges 40 and to make the thickness of retainer 30 at flanges 40 no greater than the thickness of rotor disk 60.

The assembly of insert 10, rotor disk 60 and retainer 30 will be described in connection with FIG. 5 which shows insert 10 already in notch 66 and retainer 30 being moved toward the insert 10. As will be appreciated from the shapes of insert 10 and notch 66 illustrated in FIG. 5, insert 10 can be axially inserted in notch 66; however, because the body 12 of insert 10 is wider than the portion of insert 10 at the ends 16 of legs 14, the insert cannot be radially inserted or removed. Thus the engagement between insert 10 and notch 66 substantially prevents radially relative movement between the insert 10 and the rotor disk 60. Retainer 30 is then connected to insert 10 by moving central body portion 34 of the retainer into gap 18 in insert 10 until flaps 46 on the retainer 30 engage the spaced inner walls 20 near distal ends 16 of legs 14. As continued radial pressure is applied, flaps 46 flex toward second central portion side walls 44 to allow central portion 34 to enter gap 18 in insert 10. This process continues until the ends 50 of flaps 46 reach soffits 24 on inner walls 20 of insert legs 14 and are biased outwardly by the energy stored in hinge portions 48 when the flaps 46 were compressed. At this same time, parallel side walls 36 of retainer end portions 30 pass over rotor side walls 62 until top walls 38 of retainer end portions 32 contact peripheral wall portions 68 on either side of notch 66. The engagement between insert 10 and notch 66 substantially prevents the insert 10 from being radially removed from notch 66, the engagement between flaps 46 and soffits 24 substantially prevents the retainer 30 from being removed from gap 18 in insert 10, and retainer side walls 32, overlying portions of insert first and second sides 28, substantially prevent insert 10 from moving axially relative to rotor 10. With this arrangement, insert 10 is securely retained in rotor disk 60 without the use of rivets.

Figure 10:
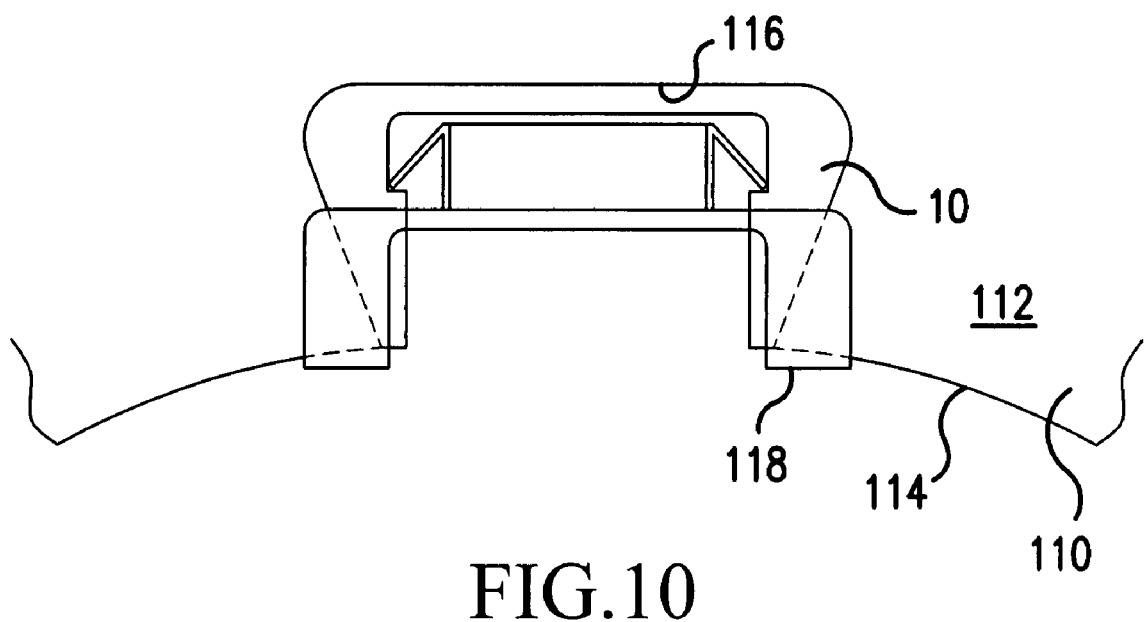
FIG. 10 is a side elevational view of the insert of FIG. 1 mounted in a peripheral notch of a stator.
Figure 11:
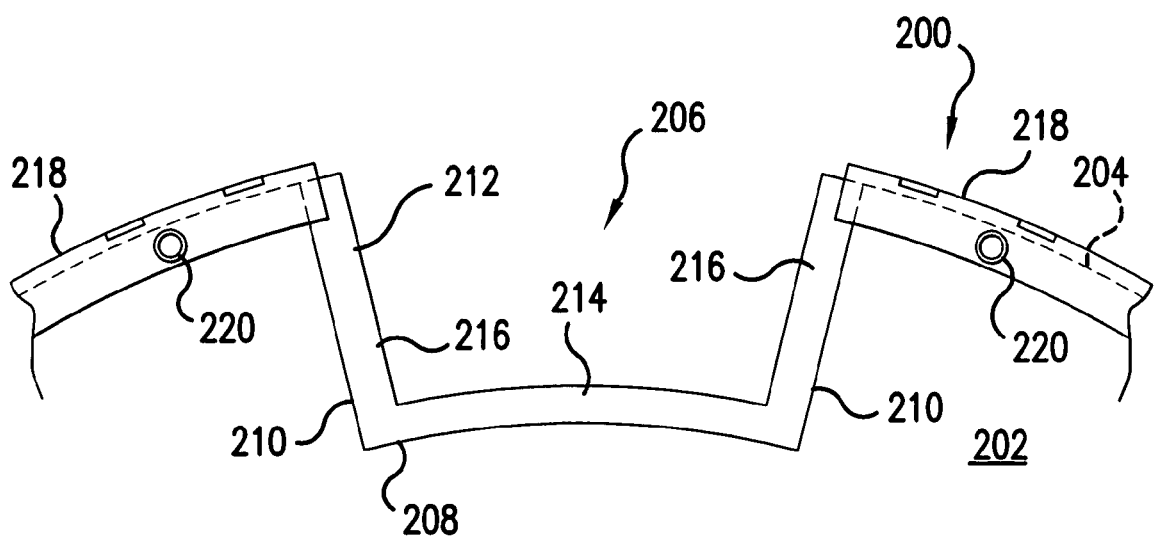
FIG. 11 illustrates a conventional rotor insert and retainer connected to a rotor disk by rivets.

A stator disk 110 is illustrated in FIG. 10 and includes first and second side walls 112 (only one of which is illustrated) connected by an inner peripheral wall 114 having a notch 116. An insert 10 is mounted in notch 116 in inner peripheral wall 114 and secured in place with a retainer 118. Retainer 118 is generally similar to retainer 30 but is curved to fit the concave inner peripheral wall 114 of stator 110 rather than the convex outer peripheral wall 64 of rotor disk 60.

Figure 8:
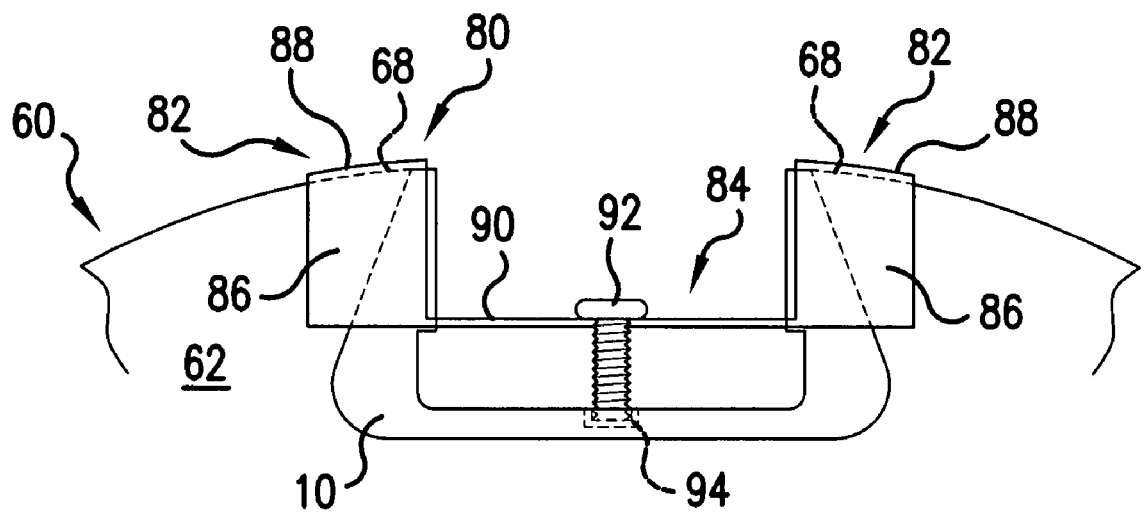
FIG. 8 is a side elevational view of a rotor, insert and retainer according to another embodiment of the present invention.

A second embodiment of the present invention is illustrated in FIG. 8 and includes rotor disk 60 and insert 10 of the previous embodiment. In this embodiment, a different retainer 80 is provided for axially retaining insert 10 in rotor disk 60. Retainer 80 includes first and second end portions 82 and a central portion 84 between the end portions 82. The end portions 82 include first and second parallel side walls 86 overlying the side walls 62 of rotor 60 and a top wall 88 overlying the peripheral wall portions 68 of rotor 60. Central portion 84 includes a central wall 90 generally parallel to the bottom 70 of notch 66, and a fastener 92, such as a screw or a bolt is threadedly secured to an opening 94 in body 12 of insert 10. In this manner, one connector is used to connect the retainer 80 to the insert 10, but no connections directly to the rotor disk are required. A similar arrangement may be used to secure an insert 10 to a notch 116 in the inner peripheral wall 118 of stator 110.

Figure 9:
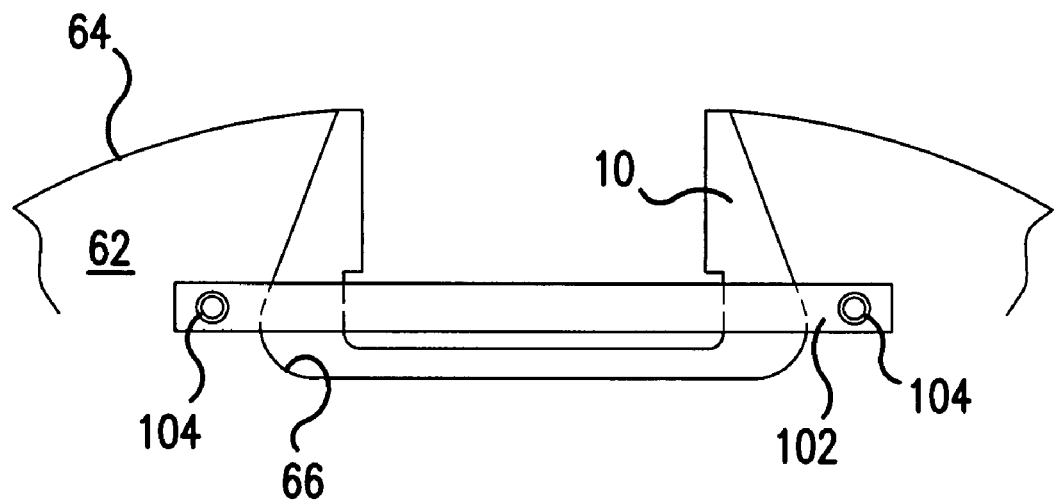
FIG. 9 is a side elevational view of a rotor, insert and retainer according to another embodiment of the present invention.

A third embodiment of the present invention is disclosed in FIG. 9 and uses the same rotor 60 and insert 10 of the previous embodiments and an alternate retainer 100. Retainer 100 comprises a pair of bars 102, only one of which is visible in FIG. 9, connected to opposite sides 62 of rotor 60 across notch 66 with rivets 104. Bars 102 retain insert 10 axially in notch 66 while the complementary shapes of insert 10 and notch 66 radially retain the insert 10. While this embodiment uses rivets to connect the retainer 100 to the rotor disk 60, it may allow for a reduction in the number of rivets needed as compared with certain prior arrangements. A similar arrangement may be used to secure an insert 10 to a notch 116 in the inner peripheral wall 118 of stator 110.

The present invention has been described herein in terms of several embodiments. Obvious modifications and additions to these embodiments will become apparent to those skilled in the relevant art upon a reading of the foregoing disclosure. It is intended that all such modifications and additions comprise a part of the present invention to the extent they fall within the scope of the several claims appended hereto.

I claim:

1. An aircraft brake element comprising:
a circular disk having first and second walls and a peripheral wall connecting said first and second walls, said peripheral wall including at least one notch having a bottom, first and second sides extending away from said bottom, and first and second edges at said peripheral wall;
an insert mounted in said notch and having first and second legs extending along said notch first and second sides, said first and second legs including inner and outer walls, said insert having a first portion having a first width between said outer walls of said insert first and second legs,
wherein a circumferential distance between said notch first side and said notch second side at a position between said notch edge and said insert first portion has a width less than said insert first portion first width; and
a retainer overlying said disk first and second walls and a portion of said insert to limit axial movement of said insert relative to said disk, said retainer including a central portion having first and second flexible flaps projecting away from the central portion and from each other, said flexible retainer flaps engaging a portion of the inner walls of said insert.

2. The aircraft brake element of claim 1 wherein said retainer overlies said first and second notch edges.

3. The aircraft brake element of claim 1 wherein said inner walls of said insert first and second legs are separated by a first distance at a first location and separated by a second distance less than said first distance at a location between said first location and said notch first edge.

4. The aircraft brake element of claim 1 wherein each of said inner walls includes a soffit.

5. The aircraft brake element of claim 4 wherein said retainer includes a flexible retainer flap engaging said soffits of said inner walls.

6. The aircraft brake element of claim 1 wherein said retainer is connected to said insert.

7. The aircraft brake element of claim 1, wherein
said retainer overlies said peripheral wall,
each of said inner walls includes a soffit, and
said retainer includes a flexible retainer flap engaging said soffits.

8. The aircraft brake element of claim 1 wherein said outer walls of said insert first and second legs converge toward each other in a direction toward the distal ends of said legs.

9. An aircraft brake element comprising:
a circular rotor or stator disk having first and second walls and a peripheral wall connecting said first and second walls, said peripheral wall including at least one notch having a bottom and first and second sides extending away from said bottom;
an insert mounted in said notch and having first and second legs extending along said notch first and second sides, said first and second legs including inner and outer walls, said insert and notch being mutually configured such that said insert is axially but not radially removable from said notch; and
a retainer overlying said disk first and second walls to limit axial movement of said insert relative to said rotor or stator disk, said retainer including a central portion having first and second flexible flaps projecting away from the central portion and from each other, said a flexible flaps engaging a portion of the insert first side inner wall.

10. The aircraft brake element of claim 9 wherein the distance between said notch first and second sides at said notch bottom is greater than the distance between said notch first and second sides at said peripheral wall.

11. A method of securing an insert in a peripheral notch of an aircraft brake element comprising the steps of:
providing an aircraft brake disk having first and second sides and a peripheral wall having a notch, the notch having side edges converging in a direction toward the peripheral wall having the notch;
providing an insert comprising a central body and first and second legs projecting from the central body, outer portions of the first and second legs converging toward each other;
axially inserting the insert into the peripheral notch;
providing a retainer having a central portion and having first and second parallel walls;
radially inserting the central portion of the retainer into the notch such that the retainer first and second parallel walls overlie the rotor first and second sides; and
securing the retainer to the insert wherein
said step of providing a retainer having a central portion comprises the step of providing a retainer having a central portion having first and second flexible flaps projecting away from the central portion and from each other, and
said step of radially inserting the central portion into the notch comprises the step of inserting the central portion until the flaps each engage a soffit on the first and second legs.

* * * * *

UNITED STATES PATENT AND TRADEMARK OFFICE
CERTIFICATE OF CORRECTION

| | | |
|---|---|---|
| PATENT NO. | : 7,766,133 B2 | Page 1 of 1 |
| APPLICATION NO. | : 11/806771 | |
| DATED | : August 3, 2010 | |
| INVENTOR(S) | : James Jay Cress | |

It is certified that error appears in the above-identified patent and that said Letters Patent is hereby corrected as shown below:

Col. 6, Line 30 (Claim 9), "said a flexible" should be --said flexible--

Signed and Sealed this
Fifteenth Day of May, 2012

David J. Kappos
*Director of the United States Patent and Trademark Office*